US010200383B2

(12) United States Patent
Hodgman et al.

(10) Patent No.: US 10,200,383 B2
(45) Date of Patent: Feb. 5, 2019

(54) NEUTRALIZING MALICIOUS LOCATORS

(71) Applicant: Rapid7, Inc., Boston, MA (US)

(72) Inventors: Roy Hodgman, Cambridge, MA (US); Aditya Kuppa, Belfast (IE); Suchin Gururangan, Somerville, MA (US); Andrew Reece, Palo Alto, CA (US)

(73) Assignee: Rapid7, Inc., Boston, MA (US)

( * ) Notice: Subject to any disclaimer, the term of this patent is extended or adjusted under 35 U.S.C. 154(b) by 141 days.

(21) Appl. No.: 15/196,072

(22) Filed: Jun. 29, 2016

(65) Prior Publication Data

US 2018/0007065 A1 Jan. 4, 2018

(51) Int. Cl.
*G06F 11/00* (2006.01)
*H04L 29/06* (2006.01)
*G06F 12/14* (2006.01)

(52) U.S. Cl.
CPC ...... *H04L 63/1416* (2013.01); *H04L 63/1441* (2013.01)

(58) Field of Classification Search
CPC .............. H04L 63/101; H04L 63/1425; H04L 63/1441; H04L 63/145; H04L 63/1483; H04L 63/1416; G06F 17/30864; G06F 21/53; G06F 21/566; G06F 2221/034; H03H 19/004
USPC ................... 726/22, 23, 24; 713/188; 706/13
See application file for complete search history.

(56) References Cited

U.S. PATENT DOCUMENTS

| | | | | |
|---|---|---|---|---|
| 2008/0010683 A1* | 1/2008 | Baddour | ........... | G06F 17/30864 726/24 |
| 2008/0126479 A1* | 5/2008 | Zhang | ................ | H04N 7/17318 709/203 |
| 2009/0158430 A1* | 6/2009 | Borders | ................ | G06F 21/552 726/23 |
| 2009/0210944 A1* | 8/2009 | Greiner | ................... | G06F 21/56 726/24 |
| 2012/0158626 A1* | 6/2012 | Zhu | ......................... | G06F 21/56 706/13 |
| 2014/0298460 A1* | 10/2014 | Xue | .................... | H04L 63/1425 726/23 |
| 2015/0200963 A1* | 7/2015 | Geng | ..................... | G06F 21/51 726/22 |
| 2015/0244728 A1* | 8/2015 | Tao | ........................ | H04L 63/14 726/23 |
| 2017/0359368 A1* | 12/2017 | Hodgman | ........... | H04L 63/1441 |
| 2018/0007065 A1* | 1/2018 | Hodgman | ........... | H04L 63/1441 |

OTHER PUBLICATIONS

The Algorithmization of the Hyperlink, Anne Helmond, Department of Media Studies University of Amsterdam, Nov. 16, 2013 (Year: 2013).*

\* cited by examiner

*Primary Examiner* — Gary S Gracia
(74) *Attorney, Agent, or Firm* — Danielson Legal LLC

(57) ABSTRACT

Methods and systems for neutralizing malicious locators. Threat actors may shut down their web pages or applications (i.e., resources) that serve malicious content upon receiving request(s) configured to be perceived by the resource as non-browser requests. Therefore, initiating (large-scale) non-browser requests, or requests that are at least perceived as non-browser requests, may effectively act to inhibit, or even nullify, intended attack vectors.

11 Claims, 5 Drawing Sheets

NEUTRALIZING MALICIOUS LOCATORS

TECHNICAL FIELD

This invention generally relates to methods and systems for neutralizing malicious locators, and in particular methods and systems that connect to potentially malicious locators in a particular manner.

BACKGROUND

Due to their prevalence in today's society and popularity for connecting financial resources and data sources, the internet and connected networks have become a hub for criminal activity. Criminal enterprises and/or threat actors often attempt to install malware or other types of harmful software on systems by directing unsuspecting users to malicious network resources (e.g., malicious web addresses) through hyperlinks or other locators, for example.

A need exists, therefore, for methods and systems that can neutralize these malicious locators to prevent them from serving malicious content to users.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for neutralizing at least one malicious locator accessible through a network. The method includes identifying, through an interface to a computer-readable medium, a plurality of locators, each locator comprising the location of a potentially malicious network-accessible resource; requesting content from a locator of the plurality of locators via at least one program configured to be perceived by the resource as a non-browser program; and iterating the step of requesting content for locators remaining in the plurality after transmitting the request for content from the at least one configured program.

In one embodiment, the locator is a uniform resource identifier (URI).

In one embodiment, the method further includes requesting, via at least one browser program, content from the at least one locator to determine whether the locator provides content after receiving the request for content from the at least one configured program. In one embodiment, the method further includes issuing an alert if the locator does not provide content in response to the request from the at least one browser program.

In one embodiment, requesting content from the locator includes requesting content through at least one of a curl command or a wget command.

In one embodiment, requesting content from the locator includes requesting content via a plurality of programs configured to be perceived by the resource as non-browser programs.

In one embodiment, the method further includes associating the configured program with a desired internet protocol (IP) address.

In another aspect, embodiments relate to a system for neutralizing at least one malicious locator accessible through a network. The system includes an interface to a computer-readable medium, a network interface, and a processor in communication with the medium interface and the network interface. The processor is configured to identify a plurality of locators, each locator comprising the location of a potentially malicious network-accessible resource; request content from a locator of the plurality of locators via at least one program configured to be perceived by the resource as a non-browser program; and iterate the step of requesting content for locators remaining in the plurality after transmitting the request for content from the at least one configured program.

In one embodiment, the locator is a uniform resource identifier (URI).

In one embodiment, the processor is further configured to request, via at least one browser program, content from the at least one locator to determine whether the locator provides content after receiving the request for content from the at least one configured program. In one embodiment, the processor is further configured to issue an alert if the locator does not provide content in response to the request from the at least one browser program.

In one embodiment, the processor requests content via at least one of a curl command or a wget command.

In one embodiment, the processor is configured to request content from the locator via a plurality of programs configured to be perceived by the resource as non-browser programs.

In one embodiment, the network interface is associated with a desired IP address.

In yet another aspect, embodiments relate to a computer readable medium containing computer-executable instructions for performing a method for neutralizing at least one malicious locator accessible through a network. The medium includes computer-executable instructions for identifying, through an interface to a computer-readable medium, a plurality of locators, each locator comprising the location of a malicious network-accessible resource; computer-executable instructions for requesting content from a locator of the plurality of locators via at least one program configured to be perceived by the resource as a non-browser program; and computer-executable instructions for iterating the step of requesting content for locators remaining in the plurality after transmitting the request for content from the at least one configured program.

In one embodiment, the medium further comprises computer-executable instructions for requesting content from the locator via at least one browser program. In one embodiment, the medium further comprises computer-executable instructions for issuing an alert if the locator does not provide content in response to the request from the at least one browser program.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
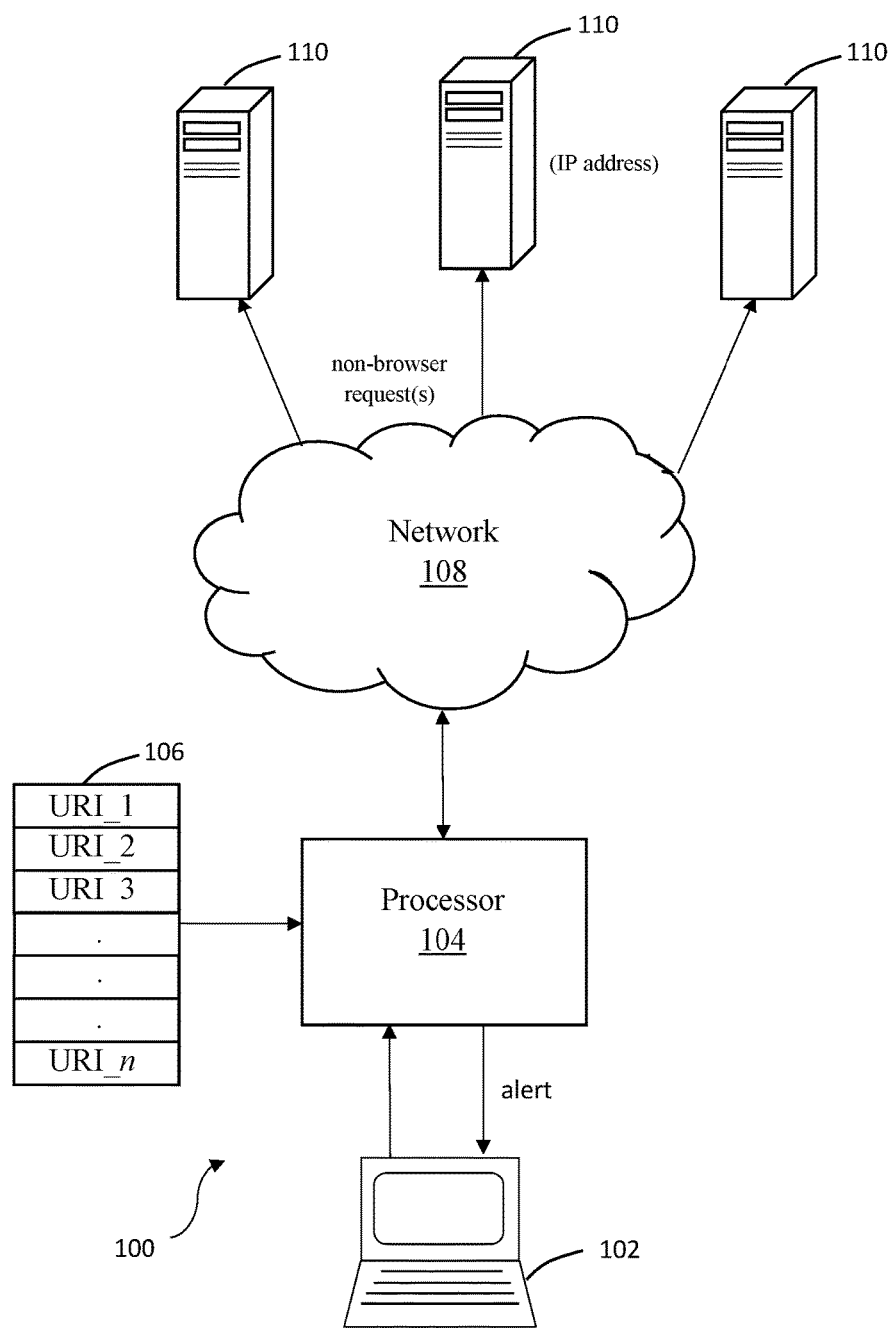
FIG. 1 illustrates a system for neutralizing at least one malicious locator in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In the context of the present application, the term "non-browser request" may refer to a request coming from a non-browser program or a request that appears to be made by a non-browser program. Similarly, the term "program configured to be perceived as a non-browser program" may include a non-browser program as well as a browser or other program that appears to be a non-browser program (e.g., by changing a user agent string, discussed below).

In the context of the present application, the term "potentially malicious" may refer to a resource that is known to be a malicious resource or is at least suspected to be malicious. For example, information security personnel may suspect a particular resource is malicious, but may not be completely certain. However, they would like to implement the methods and systems of the present invention to make sure the resource is or isn't malicious (it is noted that initiating a non-browser request to a non-malicious resource would have no effect on the non-malicious resource).

In the context of the present application, the term "locator" may refer to a location of a network-accessible resource on a network. This locator may be defined as a uniform resource identifier (URI) or a uniform resource locator (URL), for example.

Various embodiments of the present invention may be used to neutralize malicious network locators. The features of the present invention may be used to neutralize malicious URIs that are detected in email, for example. By connecting to the resources associated with suspect URIs with specially-configured programs and/or specially-configured requests, malicious network locators may be taken offline, neutralizing the threat to specific users. The features of the invention may be extended to any form of digital media in which hyperlinks are present and need to be evaluated as potential threats, such as in chat sessions or SMS messages.

When an end-user clicks on a hyperlink, the web browser software on the user's computer makes a request to the server that hosts the content associated with the hyperlink. In doing so, the web browser software on the user's computer communicates information about its specific configuration (e.g., the name and version of the browser software, along with the specifics of the user's operating system).

Through this configuration information, web servers or applications (i.e., resources) that serve malicious content (e.g., malware, phishing applications, etc.) are able to detect whether the request is coming from a browser program typically operated by an end-user, or whether the request is coming from a non-browser program (e.g., a command-line call to curl or wget or a scripting language like Python®). Web pages and applications can therefore infer whether a request is coming from an end-user or whether a request may be originating from an atypical user or an automated system. In the latter case, the web page or application can choose to deny the request.

In addition to denying access, the operators of malicious web pages or applications that serve malicious content may take the extreme step of configuring these resources to shut down a particular network locator associated with the resource when they receive one or more non-browser requests (or what appears to be non-browser requests). Operators may take this step because a non-browser request may be indicative that information security researchers have discovered the resource and are attempting to analyze and profile its behavior.

Threat actors implementing malicious web pages or applications likely have numerous other URIs that are capable of delivering the same or a similar payload. Therefore, these operators can afford to shut down a particular locator because the benefit of being cautious may outweigh the cost of, e.g., a researcher analyzing or profiling an operator's activities. Moreover, actors can easily generate numerous, rapidly-changing URIs such that any one URI involved in an attack campaign is essentially expendable.

Accordingly, information security personnel or other types of users may benefit from the threat actors' caution. In accordance with the features of the invention, information security personnel may, for example, send non-browser requests (or what appears to be non-browser requests) to suspicious locators with the intention of "spooking" the associated servers into shutting down any links requested. This provides a computationally cheap and easy way to implant a first-pass defense on incoming links (via email or other web interfaces), for example.

FIG. 1 depicts a system 100 for neutralizing at least one malicious locator in accordance with one embodiment. The system may include a user interface 102, a processor 104 receiving a list of locators 106, and a network 108 to enable the processor to transmit requests to at least one server 110.

The user interface 102 may be implemented as a laptop, desktop, tablet, smartphone, or any other similar device that may be at risk of accessing malicious locators.

The processor 104 may be any hardware device capable of transmitting requests to the at least one server 110. The processor 104 may include a microprocessor, a field programmable gate array (FPGA), application-specific integrated circuit (ASIC), or other similar devices. In some embodiments, such as those relying on one or more ASICs, the functionality described as being provided in part via software may instead be configured into the design of the ASICs and, as such, the associated software may be omitted. The processor 104 may be configured as part of the user interface 102 (e.g., a laptop) or may be located at some remote location.

The list of locators 106 may include a plurality of locators such as URIs (or entire domains) that may be suspected as malicious.

The network 108 may enable the processor 104 to transmit various requests to at least one server 110. The network 108 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network 108 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GS) link, a cellular digital packet data (CDPD) link, a Research in Motion, Limited (RIM) duplex paging type device, a Bluetooth radio link, or an IEEE 802.11-based link.

The exact type and configuration of the network 108 may vary as long as the processor 104 can transmit requests to at least one server 110. As shown, each non-browser program may be associated with a particular internet protocol (IP) address.

The requests transmitted to the at least one server 110 may be a request from a non-browser program (e.g., a command-line call to curl, wget, httpie, an http library provided for a programming language, etc.), a script written in a scripting language such as Python, or a program written using a relevant library (e.g., requests (http://docs.python-requests.org/en/master/), http (https://nodejs.org/api/http.html), rest-client (https://github.com/rest-client/rest-client), http-client (http://hc.apache.org/httpcomponents-client-ga/index.html), etc.). Or, a standard browser (e.g., CHROME, SAFARI, FIREFOX, etc.) may be used as long as the browser is configured to present requests perceived to be originating from a non-browser program.

Figure 2:
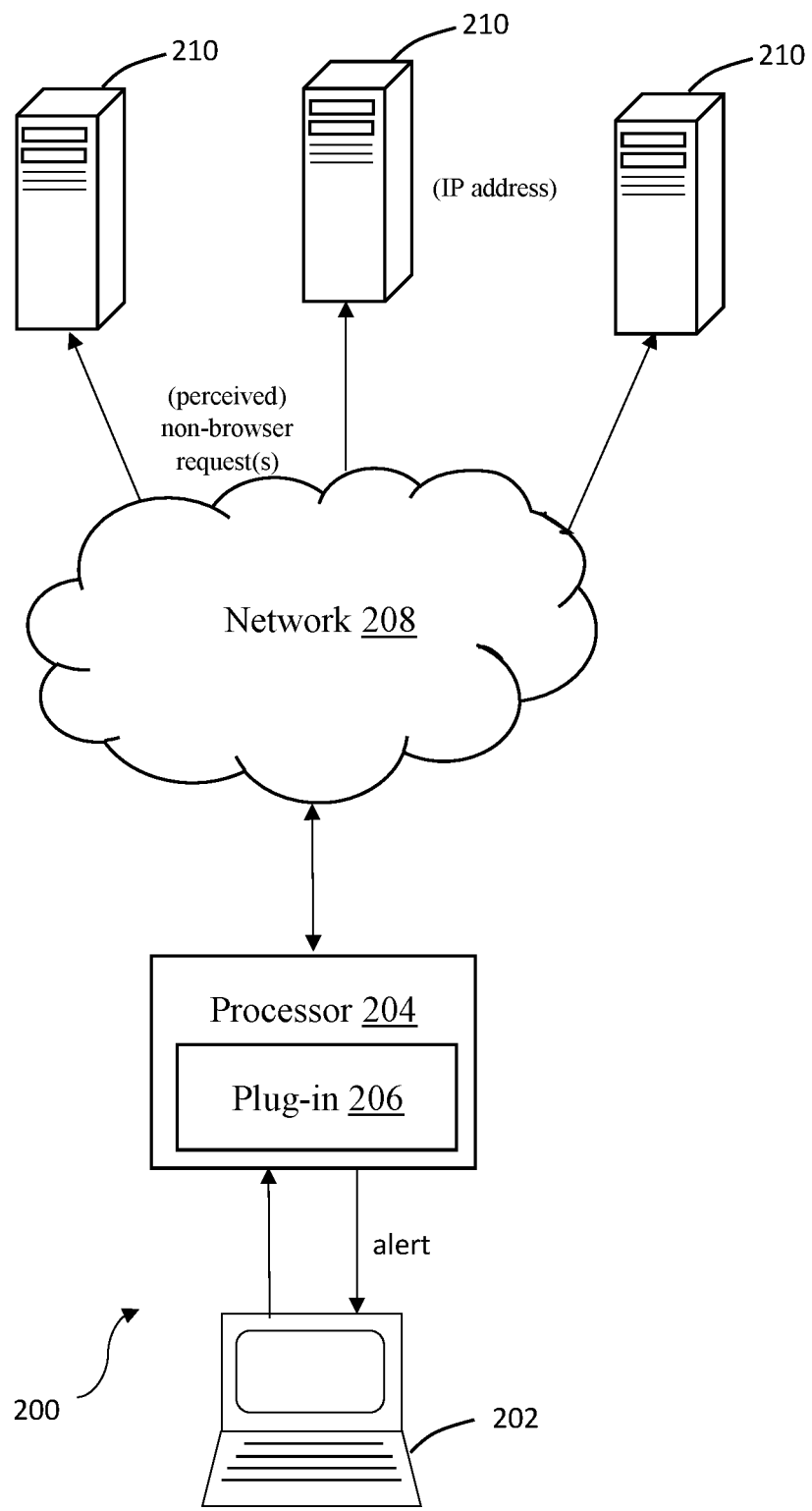
FIG. 2 illustrates a system for neutralizing at least one malicious locator in accordance with another embodiment.

For example, FIG. 2 illustrates a system 200 for neutralizing at least one malicious locator in accordance with another embodiment. In this embodiment, the user interface 202 (such as the user interface 102 of FIG. 1) may use a standard web browser. However, in this embodiment, the processor 204 (such as the processor 104 of FIG. 1) may execute a plug-in 206 to change the user agent string (UAS) so that requests coming from the browser may appear to be coming from a non-browser program (such as a UAS from a curl or wget command).

These requests may be communicated, via a network 208 (such as the network 108 of FIG. 1) to at least one server 210, wherein the processor 204 running the browser and/or plug-in processes may be associated with a desired IP address. Additionally or alternatively, the system 200 could use a non-browser program exclusively but configure the non-browser program to use a browser-based application UAS for information gathering in order to not be detected, and switch to use a non-browser UAS when attempting to trick the malicious network-accessible resource into disabling a particular network location.

The systems of FIGS. 1 and 2 may repeatedly send multiple requests to a plurality of web pages or applications. For example, malicious web pages or applications may have a tolerance to non-browser requests in that they will shut down a particular network location only after receiving multiple requests exceeding a threshold (rather than just one request), multiple requests in a certain time period, multiple requests originating from a particular IP address or domain, etc. Accordingly, the processor 104, 204 may iterate the content-requesting process a number of times in order to increase the likelihood that a certain network location is shut down or is otherwise neutralized.

After a certain number of non-browser requests (or requests at least configured to be perceived as non-browser requests) have been transmitted to a certain network location, the processor 104, 204 may be configured to transmit browser requests for content from a particular web page or application to the same location. If the web page or application is unavailable or otherwise does not return content, it may be inferred that the web page or application was serving malicious content and was triggered into shutting down by receiving the non-browser request(s). An alert to that effect may be communicated to an end-user via the user interface 102, 202 (e.g., a video based alert, an audio-based alert, a haptic-based alert, or some combination thereof) to inform the user a particular page or application was shut down and additional actions may be taken, such as adding the network location to a list of malicious URLs, adding the domain of the network location to a list of malicious domains, obtaining the registration information for the network location and using it to identify additional network locators that may be malicious, etc.

If the web page or application returns content, it may be inferred that the web page or application does not serve malicious content (or at least does not have an auto-shutdown feature). It could also be inferred that more non-browser requests to the web page or application could be made (e.g., if the web page or application has a tolerance to receiving non-browser requests) to verify this inference. An alert based on these inferences (such as those described above) may similarly be communicated to an end-user via the user interface 102, 202 and additional actions can be taken as described above (e.g., adding the network location to a list of non-malicious URLs, adding the domain of the network location to a list of non-malicious domains, obtaining the registration information for the network location and using it to identify additional network locators that may be non-malicious, etc.).

Figure 3:
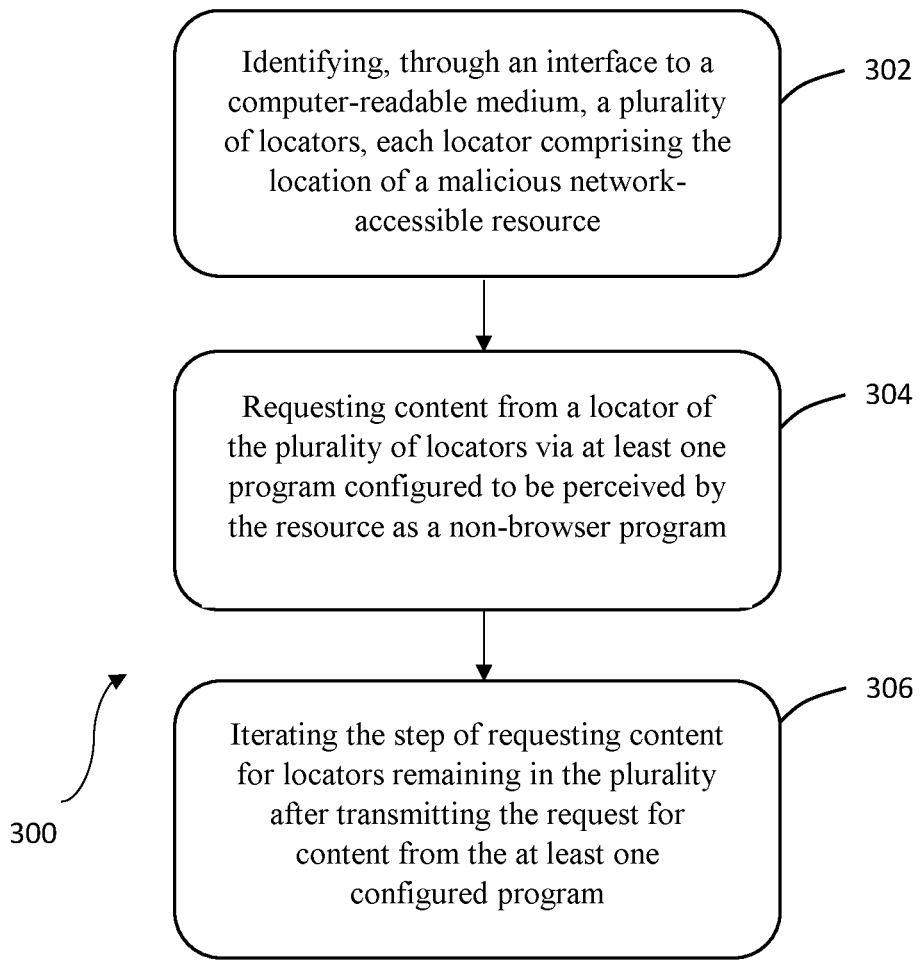
FIG. 3 depicts a flowchart of a method for neutralizing at least one malicious locator in accordance with one embodiment.

FIG. 3 depicts a flowchart of a method 300 of neutralizing at least one malicious locator in accordance with one embodiment. Step 302 involves identifying, through an interface to a computer-readable medium, a plurality of locators, each locator comprising the location of a potentially malicious network-accessible resource. The locators may be a series of URIs or URLs such as those illustrated in FIG. 1, and may correspond to web pages or applications that are suspected of serving malicious content.

Step 304 involves requesting content from a locator of the plurality of locators via at least one program configured to be perceived by the resource as a non-browser program. As discussed above, a non-browser program may include, but is not limited to, any type of non-browser library tools such as a curl command, wget, or other types of Python requests, for example.

Additionally, the request isn't required to be a non-browser request, as long as it is perceived by the web page or application as a non-browser request. As discussed above, a web browser, in conjunction with a plug-in, may transmit a request that appears to be a non-browser request.

Step 306 involves iterating the step of requesting content for locators remaining in the plurality after transmitting the request for content from the at least one configured program. In other words, the processor may send multiple requests to a given locator to increase the likelihood of neutralizing the locator. It follows that, as more requests are made, there will be fewer locators in the plurality of locators that remain alive. This step of requesting content may be iterated a number of times depending on the initial number of locators in the plurality and/or the number of locators remaining after a predetermined period of time, and/or after the processor makes a predetermined number of requests, for example.

Figure 4:
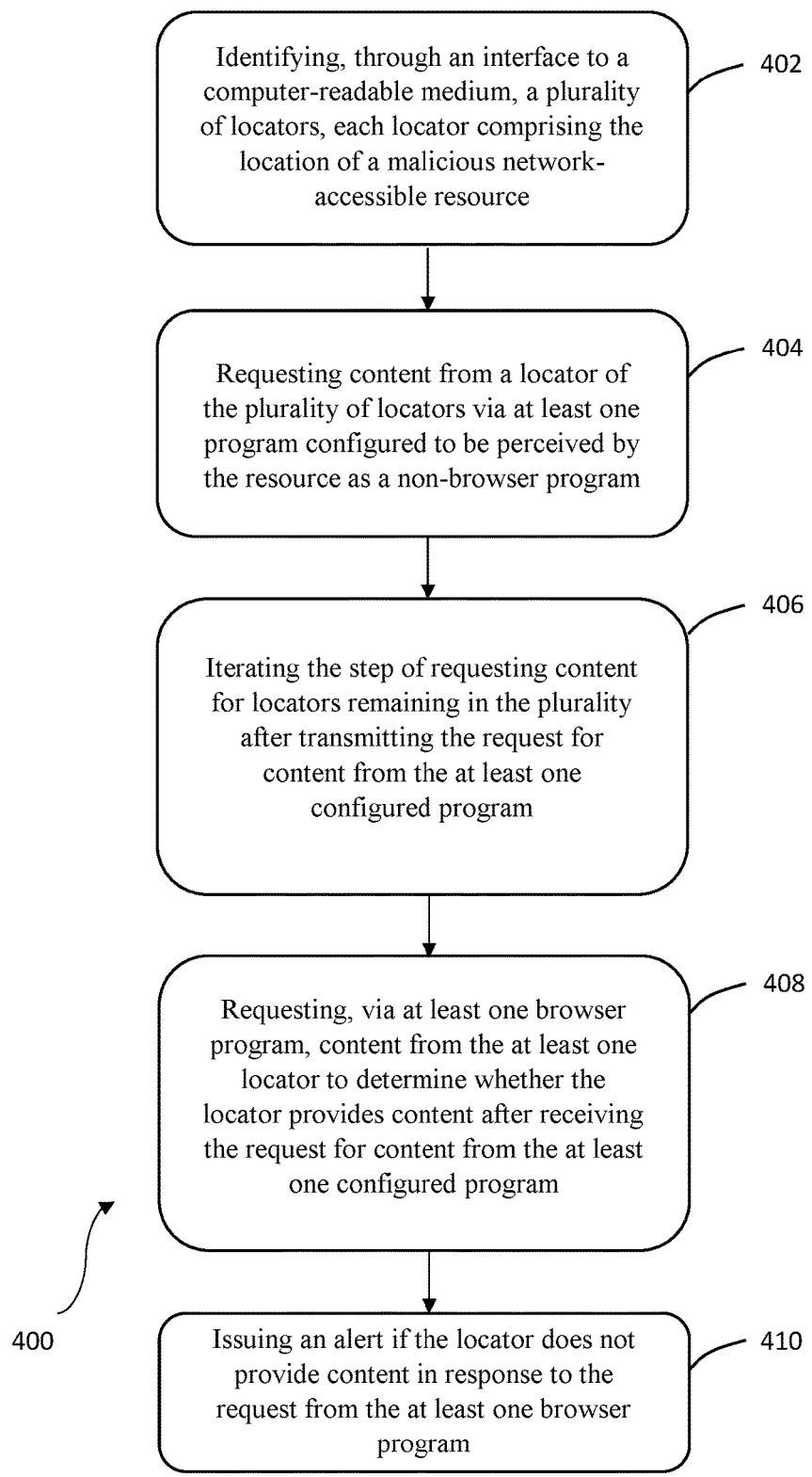
FIG. 4 depicts a flowchart of a method for neutralizing at least one malicious locator in accordance with another embodiment.

FIG. 4 depicts a flowchart of a method 400 of neutralizing at least one malicious locator in accordance with another embodiment. Steps 402, 404, and 406 of method 400 are similar to steps 302, 304, and 306 of FIG. 3, respectively, and are not repeated here.

Step 408, however, involves requesting, via at least one browser program, content from the at least one locator to determine whether the locator provides content after receiving the request for content from the at least one configured program. This step 408 is optional and may be taken to confirm whether a particular locator (or locators) were serving malicious content based on whether they remain live (return content). If the particular locator or locators return content after receiving the request from the browser program, it may be inferred they do not serve malicious content or that further iterations should be made to achieve greater certainty.

If a particular locator or locators do not return content after receiving the request from the browser program, it may be inferred they served malicious content. In this case, the method 400 may proceed to step 410 which involves issuing an alert to inform an end-user (e.g., information security personnel) that a particular locator has been shut down.

Figure 5:
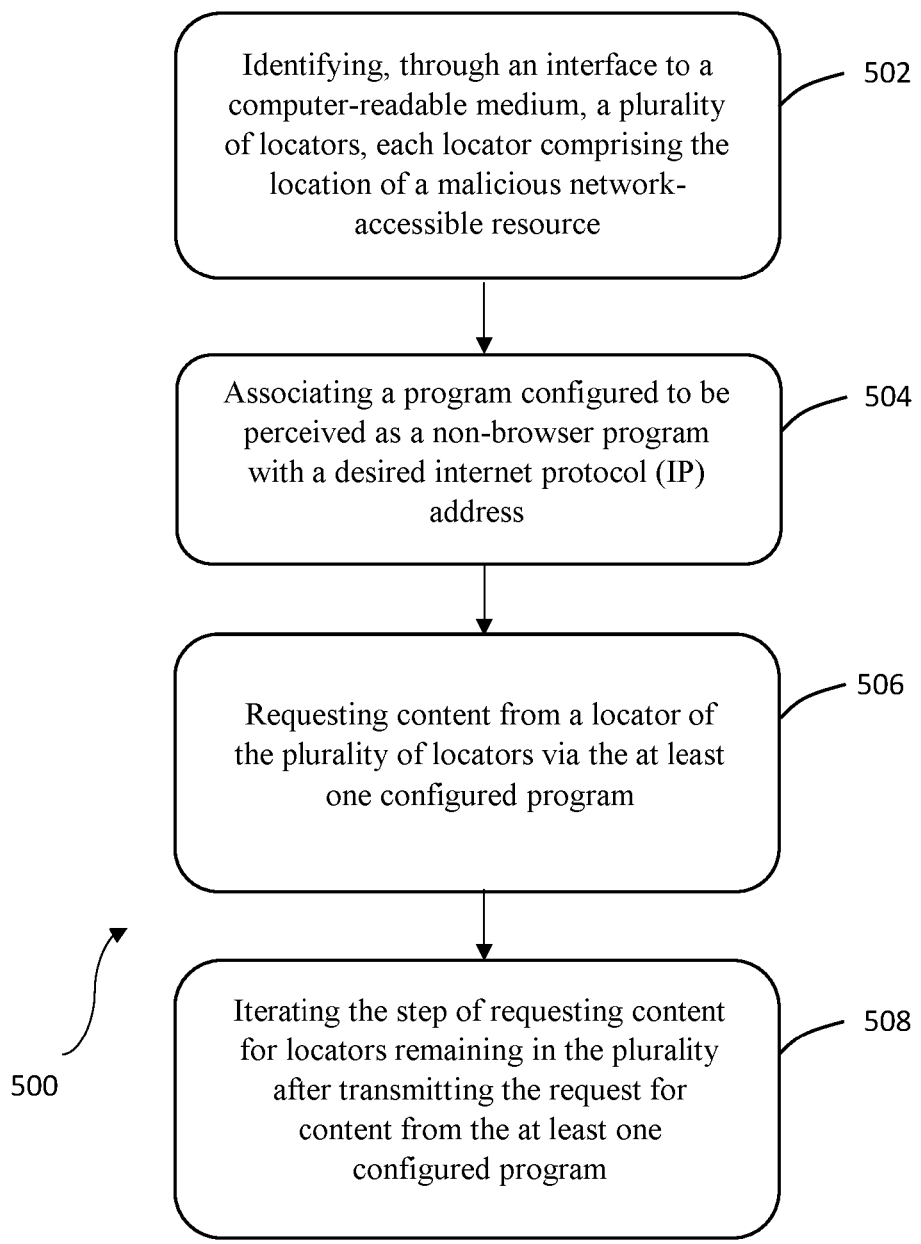
FIG. 5 depicts a flowchart of a method for neutralizing at least one malicious locator in accordance with yet another embodiment.

FIG. 5 depicts a flowchart of a method 500 of neutralizing at least one malicious locator in accordance with yet another embodiment. Steps 502, 506, and 508 are similar to steps 302, 304, and 306 of FIG. 3, respectively, and are not repeated here.

Step 504, however, involves associating a program configured to be perceived as a non-browser program with a desired internet protocol (IP) address. In other words, a particular non-browser request (or a request at least perceived as a non-browser request) may be associated with a particular web page or application suspected of serving malicious content.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for neutralizing at least one malicious locator accessible through a network, the method comprising:
   identifying, through a computer interface within a computing device comprising a non-transitory computer-readable medium that is not a transitory signal, a plurality of locators received through a communication network, each locator comprising a location of a malicious network-accessible resource that is associated with a malicious service that is suspected of serving malicious content;
   requesting content from a locator of the plurality of locators via at least one non-browser program repeatedly until the malicious network-accessible resource discontinues the malicious service;
   after a certain number of non-browser requests have been transmitted to the locator, transmitting browser requests for content from the locator, and when the malicious network-accessible resource is unavailable or otherwise does not return content, identifying that the malicious service was serving malicious content and was triggered into shutting down by receiving the non-browser requests; and
   issuing an alert to inform an end-user that the particular locator has been shut down or adding the network location to a list of malicious network locations.

2. The method of claim 1, wherein the locator is a uniform resource identifier (URI).

3. The method of claim 1, wherein requesting content from the locator includes requesting content through at least one of a curl command or a wget command.

4. The method of claim 1, wherein requesting content from the locator includes requesting content via a plurality of non-browser programs.

5. The method of claim 1 further comprising associating the non-browser program with a desired internet protocol (IP) address.

6. A system for neutralizing at least one malicious locator accessible through a network, the system comprising:
   a computing interface within a computing device comprising a non-transitory computer-readable medium that is not a transitory signal;
   a network interface; and
   a processor in communication with the non-transitory computer-readable medium interface and the network interface, the processor configured to:
   identify a plurality of locators received through a communication network, each locator comprising a location of a malicious network-accessible resource that is associated with a malicious service that is suspected of serving malicious content;
   request content from a locator of the plurality of locators via at least one non-browser program repeatedly until the malicious network-accessible resource discontinues the malicious service;
   after a certain number of non-browser requests have been transmitted to the locator, transmit browser requests for content from the locator, and when the malicious network-accessible resource is unavailable or otherwise does not return content, identify that the malicious service was serving malicious content and was triggered into shutting down by receiving the non-browser requests; and
   issue an alert to inform an end-user that the particular locator has been shut down or add the network location to a list of malicious network locations.

7. The system of claim 6, wherein the locator is a uniform resource identifier (URI).

8. The system of claim 6, wherein the processor requests content via at least one of a curl command or a wget command.

9. The system of claim 6, wherein the processor is configured to request content from the locator via a plurality of non-browser programs.

10. The system of claim 6, wherein the network interface is associated with a desired internet protocol (IP) address.

11. A non-transitory computer readable medium containing computer-executable instructions for performing a method for neutralizing at least one malicious locator accessible through a network, wherein the non-transitory computer readable medium is not a transitory memory device, the medium comprising:

computer-executable instructions for identifying, through a computer interface within a computing device comprising a computer-readable medium, a plurality of locators received through a communication network, each locator comprising a location of a malicious network-accessible resource that is associated with a malicious service that is suspected of serving malicious content;

computer-executable instructions for requesting content from a locator of the plurality of locators via at least one non-browser program repeatedly until the malicious network accessible resource discontinues the malicious service;

computer-executable instructions for after a certain number of non-browser requests have been transmitted to the locator, transmitting browser requests for content from the locator, and when the malicious network-accessible resource is unavailable or otherwise does not return content, identifying that the malicious service was serving malicious content and was triggered into shutting down by receiving the non-browser requests, and;

computer-executable instructions for issuing an alert to inform an end-user that the particular locator has been shut down or adding the network location to a list of malicious network locations.

\* \* \* \* \*